United States Patent Office 3,756,986
Patented Sept. 4, 1973

3,756,986
PROCESS FOR PREPARING POLYESTERS FROM ACYLOXYETHYL TEREPHTHALATES
Joseph L. Russell, Ridgwood, N.J., assignor to Halcon International, Inc.
No Drawing. Filed Dec. 16, 1971, Ser. No. 208,925
Int. Cl. C08g 17/003
U.S. Cl. 260—75 M    14 Claims

ABSTRACT OF THE DISCLOSURE

Fiber and film-forming polyethylene terephthalate resins are prepared from bis-(beta-acyloxyethyl) terephthalates, mono-(beta-acyloxyethyl) terephthalates, or mixtures thereof, the acyl groups of which have from 1 to 4 carbon atoms, by a process comprising the steps of adding ethylene glycol to the terephthalates, reacting the resulting mixture to liberate acyl groups associated with the acyloxyethyl moiety of the terephthalates, and to effect reaction with free terephthalic carboxyl groups present in the terephthalates, and to form bis-(beta-hydroxyethyl) terephthalate, and polymerizing the bis-(beta-hydroxyethyl) terephthalate so obtained.

---

Fiber or film-forming polyethylene terephthalate resins are important commercial commodities and are produced on a large scale. To date, however, substantially all commercial production of these resins has proceeded from terephthalic acid by one of two routes. One of those routes involves the reaction of terephthalic acid directly with ethylene glycol to form the polymer. The other of these routes comprises the esterification of terephthalic acid with methanol to form dimethyl terephthalate which is then reacted with ethylene glycol to form bis-(beta-hydroxyethyl) terephthalate which is subsequently polymerized.

While these two routes are effective to produce the desired products they both suffer from the same major drawback, which is the necessity for the use of extremely pure terephthalic acid or dimethyl terephthalate in order to provide resin products of acceptable quality. Purification techniques for these materials do, of course, exist but have proven to be extremely expensive, largely as a result of the exceedingly poor solubility characteristics of terephthalic acid and the extremely low volatility of its dimethyl ester. These monomers have conventionally been purified by multiple high temperature recrystallizations coupled with distillation under extremely high vacuum. Such purification techniques have been deemed necessary even though they are notoriously expensive because it has heretofore been thought that only extremely pure monomeric components were suitable for the manufacture of polyesters.

It has been proposed to convert terephthalic acid to bis-(beta-acetoxyethyl) terephthalate and then to convert this acetoxyethyl diester of terephthalic acid directly to the polyester resin. (See British patent specification No. 760,125). Despite the superficial attractiveness of this route, however, it has not found commercial acceptance and, indeed, efforts to polymerize bis-(beta-acetoxyethyl) terephthalate directly have been successful only to the extent of producing polymers of little or no utility in preparation of fibers or films.

It is accordingly an object of this invention to provide an improved process for the production of polyester resins, specifically polyethylene terephthalate resins, which avoids the drawbacks and disadvantages of prior processes.

It has been found that mono-(beta-acyloxyethyl) terephthalates, bis-(beta-acyloxyethyl) terephthalates, and mixtures of mono- and bis-(beta- acyloxyethyl) terephthalates (which, for convenience, will be referred to as "mono-bis mixtures") can be reacted with ethylene glycol to produce precursors which can be readily polymerized or polycondensed to produce polyester resins of high quality. These acyloxyethyl terephthalates can be readily prepared, e.g. by reacting terephthalic acid and ethylene glycol diesters of lower carboxylic acids, such as ethylene glycol diacetate and ethylene glycol diformate, e.g. by heating. See co-pending applications Ser. No. 780,274 filed Nov. 29, 1968 and Ser. No. 41,653 filed May 28, 1970, both now abandoned, and Belgian Pat. No. 742,175. When co-produced carboxylic acid is not removed during the reaction formation of mono-bis mixtures is favored, whereas removal of carboxylic acid leads to substantially exclusive formation of bis-(beta-acyloxyethyl) terephthalates. The proportion of mono-(beta-acyloxyethyl) terephthalate in the product is further favored by adding the appropriate carboxylic acid, e.g. acetic acid, to the reaction mixture. The terephthalic acid purity required to make the acyloxyethyl derivative is not high and the impurities normally present in terephthalic acid do not impurities can readily be removed from the acyloxyethyl ester once it is formed. Mono-(acyloxyethyl) terephthalates can also be produced by reacting ethylene glycol diesters with p-toluic acid to esterify the carboxyl group in an acidolysis reaction of the type described in the above-noted references, followed by oxidation of the methyl group by oxidation techniques known in the art. However, the invention is in no way limited to, or dependent upon, any particular method of producing the acyloxyethyl terephthalates.

This invention is founded on the discovery that bis-(beta-acyloxyethyl) terephthalates, mono-(beta-acyloxyethyl) terephthalates, and mono-bis mixtures can readily be converted to high molecular weight polyester resins suitable for fibers or films. In accordance with this invention, this conversion is accomplished by a series of process steps involving the reaction with ethylene glycol of the mono- or bis-(beta-acyloxyethyl) terephthalate, or the mono-bis mixture, followed by the polymerization of the reaction mixture containing bis-(beta-hydroxyethyl) terephthalate.

The reaction with ethylene glycol is carried out by forming a mixture of (a) a material containing the bis-(beta-acyloxyethyl) terephthalate, the mono-(beta-acyloxyethyl) terephthalate, or the mono-bis mixture, and (b) ethylene glycol. The admixture is then caused to react under the influence of heat and a suitable catalyst to liberate from 25% to 100% of the acyl moieties contained in the admixture as the lower carboxylate ester of ethylene glycol and to effect reaction with 25% to 100% of the free carboxyl groups which may be present to liberate $H_2O$. The reaction mixture containing bis-(beta-hydroxyethyl) terephthalate is then polymerized to a fiber or film-forming resin.

Superifically, the primary chemical reactions involved in the process of this invention appear to be in accordance with the following chemical equation wherein the acyloxy group is assumed for convenience to be the acetoxy group:

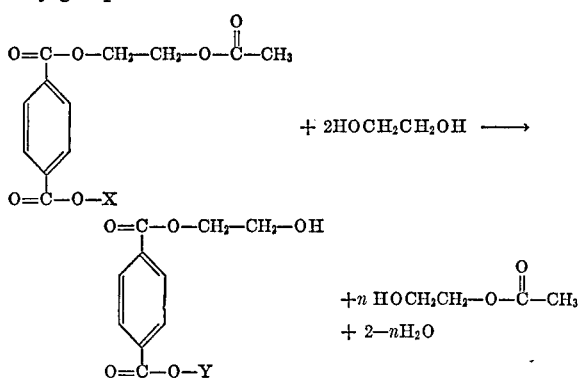

wherein $n=1$ or 2, $X=H$ or $$CH_2-CH_2-O-\overset{O}{\underset{\parallel}{C}}-CH_3$$

and $Y=H$ or $CH_2-CH_2-OH$.

As the above equation indicates, in the reaction the acetate moiety (or other acyl moiety) is liberated as the ethylene glycol monoacetate (or other like ester) and the free carboxyl group, when present, is esterified by a hydroxyethyl moiety and bis-(beta-hydroxyethyl) terephthalate, the monomer for the production of polyethylene terephthalate polyester resins, is formed.

Moreover, the reactions are far more complex than the above equation indicates and the reaction product, after removal of lower carboxylate ester co-product and any water or excess ethylene glycol present, generally contains a spectrum of materials in addition to the bis-(beta-hydroxyethyl) terephthalate monomer and unreacted acyloxyethyl terephthalates, including minor amounts of mono-(beta-hydroxyethyl) terephthalate and bis - (beta - hydroxyethyl )terephthalate - monoacrylate. There are also produced varying quantities of low molecular weight polymers, i.e. oligomers of bis-(hydroxyethyl) terephthalate. Depending upon reaction conditions, the amount of oligomer will vary from a very small amount up to as much as 50 mol percent. Generally it is in the range of 20 to 50 mol percent. Such oligomers can generally be characterized as having 2 to 10 monomer units or "segmers." In accordance with this invention, the reaction product containing this broad spectrum of materials in addition to the bis-(beta-hydroxyethyl) terephthalate and unreacted acyloxyethyl terephthalates, depending upon the extent of the glycolysis reaction, is the material finally polymerized to form the resin product. In view of the prior art which indicates the necessity for an extremely pure monomer to obtain satisfactory polymer, it is quite surprising to find suitable polymers obtained from so complex a mixture.

The process of this invention thus essentially involves a sequence of operating steps which are:

(1) Forming a mixture of (a) an ester consisting essentially of a bis-(beta-acyloxyethyl) terephthalate, a mono-(beta-acyloxyethyl) terephthalate, or a mono-bis mixture, the acyl group having from 1 to 4 carbon atoms, and which may also contain oligomers of bis-(beta-acyloxyethyl) terephthalate and/or mono-(beta-acyloxyethyl) terephthalate, and (b) ethylene glycol and reacting them in such manner as to liberate from 25% to 100% of the acyloxy moieties, which react with the ethylene glycol to form ethylene glycol carboxylate esters.

(2) Processing the reaction product to remove therefrom the by-product carboxylate ester, any water present, and excess glycol.

(3) Polymerizing the balance of the reaction product to form a resin product.

Although it is preferred to carry out steps "2" and "3" independently, and even in separate vessels, it is within the scope of this invention to carry them out sequentially in the same vessel or even to carry them out simultaneously, at least in part.

The terephthalate raw material for the process of this invention comprises esters of ethylene glycol consisting essentially of bis - (beta - acyloxyethyl) terephthalate, mono-(beta-acyloxyethyl) terephthalate, or a mono-bis mixture, and oligomers of one or more of these monomers may be present. The terephthalate raw material may also contain terephthalic acid, e.g. in amounts up to about 25 mol percent. Processes for the preparation of the acyloxyethyl terephthalates generally do not result in their formation without the concurrent production of oligomers, from which the monomers can be separated, as by distillation, or which can remain in admixture with the monomers. These oligomers are materials having the formula:

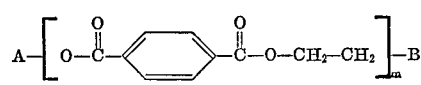

wherein "A" is, $HO-CH_2-CH_2$, or

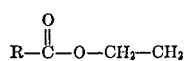

and wherein "B" is OH,

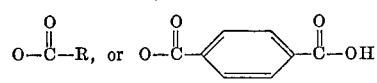

and where "R" is an alkyl radical having from 1 to 3 carbon atoms and where "m" is a number from 2 to 15, usually 2 to 10. The process of this invention contemplates the optional inclusion of such oligomers in the feed thereto and thus the feed material consists essentially of the bis-(beta-acyloxyethyl) terephthalate or the mono-(beta-acyloxyethyl) terephthalate, or the mono-bis mixture, and may contain oligomers of one or both of these terephthalates particularly the lower molecular weight oligomers, such as the dimers, which may be present even after distillation if a sharp separation is not effected.

The diester itself has the structural formula:

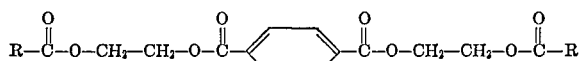

whereas the monoester has the formula

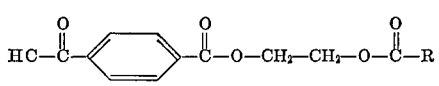

where "R" has the same meaning as that set forth in the preceding paragraph. Thus suitable feeds to the process of this invention are bis-(beta-formoxyethyl) terephthalate, bis(beta-acetoxyethyl) terephthalate, bis-(beta-propionoxyethyl) terephthalate, and bis-(beta-butyroxyethyl) terephthalate, the corresponding mono-(beta-acyloxyethyl) terephthalates, and mixtures of the mono- and bis-esters. Mixtures of these bis-terephthalates or mixtures of these mono-terephthalates can also be employed, as can inter-esters thereof, such as beta-formoxyethyl-beta-acetoxyethyl terephthalate. Of these esters, the preferred are bis-(beta-acetoxyethyl) terephthalate, mono-(beta-acetoxyethyl) terephthalate, and mixtures of the mono- and bis-(beta-acetoxyethyl) terephthalates, since acetic acid and its derivatives are relatively inexpensive and widely available.

The mono-bis mixtures may range from a mixture of bis-(beta-acyloxyethyl) terephthalate with a trace of mono-(beta-acyloxyethyl) terephthalate to a mixture of the mono-ester with a trace of the bis compound. Ordinarily, however, the bis-(beta-acyloxyethyl) terephthalate is the predominant component of the mono-bis mixture, but mixtures containing up to 70% of the monoester are entirely suitable, and good results are also readily obtained with mixtures containing up to 90 or 95% of the mono-ester. The content of oligomers will depend upon the degree of separation to which the mono- and bis-(beta-acyloxyethyl) terephthalate and the mono-bis mixtures have been subjected by distillation and the feed may contain all of the terephthalates in monomeric form or some of the monomers may be present, as mentioned, as oligomers ranging from dimers up to polymeric chains containing as many as 15 segmers. Ordinarily, less than 50% of the terephthalates are present in oligomer form, preferably less than 25%. Small amounts of numerous coproducts, in sum up to about 40 mol percent of the total feed, generally up to about 5 mol percent, associated with the production of the beta-acyloxyethyl terephthalates can also be present in the feed. The term "coproduct" is used to include by-products of the reaction, unreacted reagents, and like components of the terephthalate-producing reaction. The use of feeds containing such amounts of coproducts is also contemplated within the scope of this invention. Such coproducts include ethylene glycol, ethylene glycol mono-acrylate (e.g. the mono-acetate), ethylene glycol diacylate (e.g. the diacetate) terephthalic acid, mono-(beta-hydroxyethyl) terephthalate, bis-(beta-hydroxyethyl) terephthalate, and bis-(beta-hydroxyethyl) terephthalate-monoacylate.

For convenience, the organic feed material discussed above and consisting essentially of the bis-(beta-acyloxyethyl) terephthalate, the mono-(beta-acyloxyethyl) terephthalate, the mono-(beta-acyloxyethyl) terephthalate, or the mono-bis mixture and which may also contain corresponding oligomers, will frequently hereinafter be referred to as the "ester feed."

The co-reactant is, as mentioned, ethylene glycol, hereinafter referred to simply as "glycol." The amount of glycol employed is at least sufficient to provide .75 mol per acyloxy equivalent in the ester feed, i.e. the acyloxy moiety. Desirably, at least 1.0 mol of glycol is employed per equivalent of the acyloxy moiety in the ester feed, and preferably at least 2.0 mol of glycol is used per equivalent of the acyloxy moiety in the ester feed. The upper limit on the amount of glycol employed as co-reactant is one of economics since excess glycol is removed prior to or during polymerization. Accordingly, normally less than 10 mols of glycol per acyloxy moiety in the ester feed would be employed, desirably less than about 5 mols of glycol per equivalent of the acyloxy moiety; and preferably less than about 3 mols of glycol per equivalent of the moiety are used. An especially preferred operation employs from about 1 to about 3 mols of glycol per equivalent of acyloxy moiety in the esters, although as pointed out above, much broader ratios are quite operative.

Significant reaction conditions are temperature and time of reaction and these are directed to obtaining the desired extent of reaction. The liberation of at least 60 mol percent of the acyl groups is necessary to achieve satisfactory high molecular weight fiber or film-forming polyester resins. Desirably, at least 80 mol percent of the acyl groups are liberated and preferably at least 90 mol percent of the acyl groups are liberated during the reaction. There is, of course, no essential upper limit on the extent of reaction with glycol and it is quite practicable to operate in such fashion as to liberate close to 100% of the acyl groups and to effect reaction with substantially 100% of the free carboxyl groups which may be present in the terephthalates in the ester feed. Indeed, one of the advantages of the process of the invention is that substantially 100% conversion to bis-(beta-hydroxyethyl) terephthalate can be achieved. The extent of the reaction with glycol is readily monitored by analysis of representative samples of the materials taken overhead to determine, for example by saponification, the amount of acetic acid and acetate moieties contained therein.

Reaction temperatures of at least about 120° C. are necessary in order to obtain satisfactory rates of reaction but it is generally not desired to employ reaction temperatures above about 350° C. since at higher temperatures thermal degradation, with concomitant formation of color bodies, can become significant. The reaction is thus desirably conducted at temperatures between about 180° C. and 240° C.

Pressure is not, in any manner, critical to the conduct of the reaction so long as it is sufficient to maintain the ester feed essentially in the liquid phase. Thus, pressures of as little as .1 to .2 p.s.i.a. can be employed as also can pressures of several thousand p.s.i.a. Economy of equipment construction is the only criterion of significance in choice of pressure and this suggests that optimum pressures be between about 5 p.s.i.a. and about 5000 p.s.i.a., desirably between about 12 p.s.i.a. and about 1000 p.s.i.a. and preferably between about atmospheric pressure and about 500 p.s.i.a.

Having set forth the extent of the reaction and the reaction temperatures, the reaction times cannot be independently specified; reaction time is dependent upon the factors already discussed. Generally, however, reaction times consistent with obtaining the above mentioned extent of reaction and at the temperatures set forth would be between about 10 minutes and 100 hours and more commonly between about 20 minutes and 6 hours.

The reaction is suitably conducted catalytically. Suitable catalysts include catalysts known to be effective for the preparation of polyester resins by polycondensation in conventional manner. Thus, suitable catalysts include compounds such as the oxides, carbonates, sulfides, hydroxides, carboxylates, or the like, of antimony, zinc, calcium, cerium, cadmium, lead, lithium, zirconium, aluminum, tin, titanium, and cobalt.

Catalyst concentrations are suitably between about 10 and about 10,000 parts per million (p.p.m.), desirably between about 30 p.p.m. and about 1,000 p.p.m., and preferably less than about 500 p.p.m. These quantities are based upon the ester feed to the reaction with glycol and not on the total feed which, of course, includes the glycol.

The reaction of this invention can be conducted without extraneous solvents. Glycol itself functions as a solvent for the ester feed and there is no need for any other solvent.

As mentioned, reaction of the ester feed with glycol is advantageously conducted in the liquid phase and may be carried out either batch-wise or continuously. Similarly, in either batch or continuous operation, either one or a plurality of stages can be employed. For example, the reaction can be conducted in a plurality of autoclave type reactors connected in series, with the glycol being fed to the first stage, to each of the stages, or to any combination. The reaction can also be carried out in association with a fractional distillation unit in order to facilitate separation of by-products as the reaction proceeds.

As will be apparent from the equation set forth above, the by-products of the reaction between glycol and the ester feed are water and the lower carboxylate ester of ethylene glycol corresponding to the carboxylate group of the mono- and bis-(beta-acyloxyethyl) terephthalates contained in the ester feed, the relative proportion of water and glycol ester depending upon the composition of the ester feed. Free carboxylic acid corresponding to the acyl group of the terephthalates may also be present as a result of hydrolysis by the liberated water. These by-products can be readily separated by fractional distillation since water, glycol, the carboxylic acid, and the lower carboxylate esters of glycol have substantially lower boiling points than the corresponding terephthalates contained in the ester feed and in the reaction product. Suitably, the by-products are removed as overhead. This can be done in a separate distillation step, with at least 50%, advantageously at least 90%, of the by-products being removed. Preferably, however, the separation is concurrently effected in the main reaction zone by carrying out the reaction with glycol in suitable distillation equipment under appropriate distillation conditions. It is thus possible by removal of by-products, to bring about essentially complete reaction between the glycol and the acyloxyethyl terephthalates contained in the ester feed. The process of the invention thus lends itself to substantially 100% conversion of the feed to (hydroxyethyl) terephthalates if desired, but it is a feature of the invention that even if substantially 100% conversion is not effected, the reaction product is nevertheless a suitable precursor for high-quality polyesters and such polyesters can be produced by direct polymerization or polycondensation of the product precursor even when it contains substantial quantities of the by-product glycol ester.

The glycolysis reaction product primarily composed of bis-(beta-hydroxyethyl) terephthalate, which may be admixed with mono-(beta-hydroxyethyl) terephthalate, and generally containing minor amounts of glycol and glycol monocarboxylate ester, as well as oligomers of the terephthalates, is then the material or precursor which, in accordance with this invention, is polymerized or polycondensed to the polyester resin. The polymerization is carried out in the conventional manner normally employed for the polymerization of bis-(beta-hydroxyethyl) terephthalate. The polymerization requires the presence of a catalyst. Suitable catalysts include those previously mentioned, i.e. compounds such as the oxides, carbonates, sulfides, hydroxides, carboxylates or the like of antimony, zinc, calcium, cerium, cadmium, lead, lithium, zirconium, aluminum, tin, titanium, and cobalt. Such catalysts are conventionally employed in amounts sufficient to provide from $5 \times 10^{-6}$ to about $5 \times 10^{-2}$ mol of metal per mol of equivalent terephthalic acid contained in the feed to the polymerization. By "equivalent" terephthalic acid contained in the feed is meant not only any free terephthalic acid which may be present but its equivalent in whatever form it exists in the feed. The polymerization itself requires heating under vacuum, for example at a temperature between 220° C. and about 325° C., at a pressure from about 0.05 mm. Hg to about 20 mm. Hg, until ethylene glycol liberation ceases. This normally will require between about 20 minutes and about 6 hours. It should be noted that the material liberated during the polymerization contains not only ethylene glycol but also derivatives of the lower carboxylic acid corresponding to the acyl moiety of the feed, generally in the form of the carboxylate monoester of ethylene glycol, e.g. ethylene glycol monoacetate. From .1% to as much as 20% or even more of the ethylene glycol liberated during polymerization can be liberated in the form of such derivatives.

The final polymer produced is generally in the form of a white solid with a melting point above about 250° C. and with intrinsic viscosities greater than about 0.50 as determined in 60% phenol, 40% symmetrical tetrachloroethane (weight basis) solutions at 30° C.

The following examples will serve further to illustrate the invention but they are not intended as limiting the scope thereof. Unless otherwise stated, all parts and percents in the following examples are on a molar basis.

EXAMPLE I

A mixture is prepared by adding an ester feed consisting essentially of 1 part of a mixture of 70% bis-(beta-acetoxyethyl) terephthalate and 30% mono-(beta-acetoxyethyl) terephthalate, to 3 parts of ethylene glycol. This corresponds to a molar ratio of glycol to acyloxy moiety of 3:1. The ester feed used in this example is prepared by thermal reaction between terephthalic acid and ethylene glycol diacetate. To the mixture is also added 300 p.p.m. of zinc acetate. This mixture is charged to a reactor consisting of a heated glass vessel on top of which is disposed an Oldershaw distillation column having 20 glass trays. The mixture is heated to reflux under a pressure of 760 mm. Hg for a period of 2 hours, during which time there are removed 5.2 parts of an overhead product composed of glycol derivatives and simultaneously there are added 5.1 parts of ethylene glycol. The overhead product is analyzed and found to contain 96.3% of the charged acetate moieties. Similarly, the bottoms product is analyzed and contains 2 parts of ethylene glycol and 1 part of terephthalate moieties, some of which are in the form of a low molecular weight oligomer. The bottoms product is freed from ethylene glycol by fractional distillation through the Oldershaw column at a temperature of about 190° C. to 195° C. under a pressure of 100 mm. Hg. The bottoms product from this distillation is a solid at room temperature and is of very light cream color. This solid is then mixed with 200 p.p.m. of antimony trioxide to act as a polymerization catalyst and the resulting mixture is then charged to a glass polymerizer where it is heated to the melting point of the mixture (180° C.). After the mixture is melted, argon is bubbled through the melt and the temperature is quickly raised to 240° C. Vigorous evolution of ethylene glycol, containing some ethylene glycol monoacetate, from the melt is observed to take place, and this ethylene glycol is stripped out and taken overhead. Pressure during this initial phase of the polymerization is atmospheric. After one hour, at 240° C. the temperature is raised to 280° C. and held for one hour at atmospheric pressure, then the pressure on the polymerizer is reduced over a 30 minute period to about 1 mm. Hg while still maintaining the temperature at 280° C. Heating under vacuum is continued for an additional 3 hours during which time additional ethylene glycol and ethylene glycol monoacetate is taken overhead. At the end of this period, the contents of the polymerizer are cooled and analyzed. The product is found to be polyethylene terephthalate, white in color, having an intrinsic viscosity of 0.67, as determined in 60% phenol, 40% symmetrical tetrachloroethane (weight basis) solutions at 30° C.

EXAMPLE II

The procedure of Example I is repeated except that the feed mixture contains a greater proportion of ethylene glycol, i.e. to provide a glycol to an acyloxy moiety ratio of 8:1. The reaction product produced from the above described mixture upon polymerization produces a white polymer having an intrinsic viscosity of 0.71. (60% phenol-40% symmetrical tetrachloroethane, 30° C.)

EXAMPLE III

The procedure of Example I is again repeated employing the same quantities of ethylene glycol and ester feed except that the ester feed contains 24 mol percent of terephthalate moieties present as oligomers. The polymer quality obtained is similar to that observed in Example I.

EXAMPLE IV

The procedure of Example I is repeated using 300 p.p.m. magnesium acetate and an ester feed consisting essentially of bis-(beta-acetoxyethyl) terephthalate. The results obtained are substantially similar to those observed in Example I, the polyethylene terephthalate having an intrinsic viscosity of 0.68. (60% phenol-40% symmetrical tetrachloroethane, 30° C.).

EXAMPLE V

The procedure of Example IV is repeated employing, as the ester feed, the following materials: bis-(beta-formoxyethyl terephthalate, bis-beta-propionoxyethyl) terephthalate, bis-beta-butyroxyethyl) terephthalate, bis-(beta-isobutyroxyethyl) terephthalate, mono - (beta-acetoxyethyl) terephthalate, mono-(beta-formoxyethyl) terephthalate, mono-beta-propionoxyethyl) terephalate, mono-(beta-butyroxyethyl) terephthalate, and mono-(beta-isobutyroxyethyl) terephthalate. In each case, polymers substantially similar to that of Example I are obtained.

The embodiments of the invention in which an exclusive property is claimed are defined as follows:

1. A process for the preparation of polyethylene terephthalate from an ester feed consisting essentially of bis-(beta-acyloxyethyl) terephthalate, mono-(beta-acyloxyethyl) terephthalate, or a mixture thereof, wherein the acyl group has 1 to 4 carbon atoms, said process comprising the steps of:
(a) forming a mixture of said ester feed with ethylene glycol, the ethylene glycol being present in an amount to provide at least 0.75 mol thereof per equivalent of acyloxy moieties contained in the ester feed,
(b) reacting the mixture in the presence of a catalyst at a temperature between about 120° C. and 350° C. until the ethylene glycol has reacted with at least about 60 mol percent of the acyloxy moieties contained in the ester feed, thereby forming bis-(beta-hydroxyethyl) terephthalate and liberating the corresponding lower carboxylate ester of ethylene glycol as by-product, and
(c) polymerizing the bis-(beta-hydroxyethyl) terephthalate to form a polyethylene terephthalate resin.

2. A process as defined in claim 1, wherein the ester feed consists essentially of bis-(beta-acetoxyethyl) terephthalate or mono-(beta-acetoxyethyl) terephthalate.

3. A process as defined in claim 1, wherein the feed mixture consists essentially of a mixture of bis-(beta-acetoxyethyl) terephthalate and mono-(beta-acetoxyethyl) terephthalate.

4. A process as defined in claim 1, wherein at least 1 mol of glycol is employed in the mixture per equivalent of acyloxy moieties in the ester feed.

5. A process as defined in claim 1, wherein the temperature employed in the reaction of the mixture is between about 120° C. and about 260° C.

6. A process as defined in claim 1, wherein the by-products formed during the reaction of said mixture are removed at least in part from the reaction mixture, and the balance of the reaction mixture, containing the bis-(beta-hydroxyethyl) terephthalate, is polymerized.

7. A process as defined in claim 1, wherein the ester feed includes oligomers of the ester contained therein.

8. A process for the preparation of polyethylene terephthalate from an ester feed consisting essentially of bis-(beta-acyloxyethyl) terephthalate, mono-(beta-acyloxyethyl) terephthalate, or a mixture thereof, wherein the acyl group has 1 to 4 carbon atoms, said process comprising the steps of:
(a) forming a mixture of said ester feed with ethylene glycol, the ethylene glycol being present in an amount to provide at least 0.75 mol thereof per equivalent of acyloxy moieties contained in the ester feed,
(b) reacting the mixture in the presence of a catalyst at a temperature between about 120° C. and 350° C. until the ethylene glycol has reacted with at least about 60 mol percent of the acyloxy moieties contained in the ester feed, thereby forming bis-(beta-hydroxyethyl) terephthalate and liberating the corresponding lower carboxylate ester of ethylene glycol as by-product,
(c) removing said lower carboxylate ester of ethylene glycol from the reaction product, and
(d) polymerizing the bis-(beta-hydroxyethyl) terephthalate to form a polyethylene terephthalate resin.

9. A process as defined in claim 8, wherein the ester feed consists essentially of bis-(beta-acetoxyethyl) terephthalate or mono-(beta-acetoxyethyl) terephthalate.

10. A process as defined in claim 8, wherein the feed mixture consists essentially of a mixture of bis-(beta-acetoxyethyl) terephthalate and mono-(beta-acetoxyethyl) terephthalate.

11. A process as defined in claim 8, wherein at least 1 mol of glycol is employed in the mixture per equivalent of acyloxy moieties in the ester feed.

12. A process as defined in claim 8, wherein the temperature employed in the reaction of the mixture is between about 120° C. and about 260° C.

13. A process as defined in claim 8, wherein the by-products formed during the reaction of said mixture are removed at least in part from the reaction mixture during the course of the reaction, and the balance of the reaction mixture, containing the bis-(beta-hydroxyethyl) terephthalate, is polymerized.

14. A process in accordance with claim 8, wherein the ester feed includes oligomers of the ester.

References Cited

FOREIGN PATENTS 760,125 11/1956 Great Britain.
1,960,006 8/1970 Germany.

MELVIN GOLDSTEIN, Primary Examiner

U.S. Cl. X.R.

260—75 R, 475 P